(12) United States Patent
Zaviska (10) Patent No.: US 7,909,506 B2
(45) Date of Patent: Mar. 22, 2011

(54) VIRTUAL TEMPERATURE MEASURING POINT

(75) Inventor: Oldrich Zaviska, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 420 days.

(21) Appl. No.: 12/083,755

(22) PCT Filed: Sep. 25, 2006

(86) PCT No.: PCT/EP2006/066704
§ 371 (c)(1),
(2), (4) Date: Apr. 18, 2008

(87) PCT Pub. No.: WO2007/045546
PCT Pub. Date: Apr. 26, 2007

(65) Prior Publication Data
US 2009/0132196 A1    May 21, 2009

(30) Foreign Application Priority Data
Oct. 19, 2005   (EP) .................................... 05022820

(51) Int. Cl.
*G01K 3/00*       (2006.01)
*G01N 25/00*      (2006.01)

(52) U.S. Cl. .......... 374/115; 374/101; 374/43; 702/130; 702/136

(58) Field of Classification Search ................. 374/101, 374/115, 43; 702/130, 136
See application file for complete search history.

(56) References Cited

U.S. PATENT DOCUMENTS

| 4,657,507 A | 4/1987 | Kohama et al. |
| 5,890,805 A * | 4/1999 | Groth et al. ................ 374/4 |
| 6,824,305 B1 | 11/2004 | Boyd et al. |
| 2004/0074311 A1* | 4/2004 | Lull et al. ................ 73/861 |

FOREIGN PATENT DOCUMENTS

| DE | 40 26 731 A1 | 2/1992 |
| JP | 62101037 A | 5/1987 |
| JP | 63217621 A | 9/1988 |

* cited by examiner

*Primary Examiner* — Lisa M Caputo
*Assistant Examiner* — Mirellys Jagan (57) ABSTRACT

The invention relates to a method for determining a temperature profile and the integral mean temperature and/or axis temperature in a thick wall or shaft. In order to determine a mean integral wall temperature during heating or cooling processes in a multilayer model, the mean integral wall temperature is calculated from the mean temperature of each layer. A multilayer model is used for determining the mean integral wall temperature during heating or cooling processes and draws upon the mean temperature of each layer.

7 Claims, 6 Drawing Sheets

VIRTUAL TEMPERATURE MEASURING POINT

CROSS REFERENCE TO RELATED APPLICATIONS

This application is the U.S. National Stage of International Application No. PCT/EP2006/066704, filed Sep. 25, 2006 and claims the benefit thereof. The International Application claims the benefits of European application No. 05022820.4 filed Oct. 19, 2005, both applications are incorporated by reference herein in their entirety.

FIELD OF INVENTION

The invention relates to a method for determining the temperature profile and the average integral temperature and/or axial temperature in walls or shafts of thick-walled components, such as for example of steam collectors, steam lines, valve housings, turbine housings or shafts or the like.

BACKGROUND OF THE INVENTION

During heating-up and cooling-down processes, as occur in component walls, for example in a steam turbine, a valve housing or a steam line, in particular when changing the operating mode, temperature gradients are produced in thick walls of these components and may lead to considerable material stresses. These material stresses may lead to premature material wear to the extent that cracks form.

To monitor such temperature gradients specifically in the case of applications in steam power plants, previously at least one or more temperature measuring points were incorporated in the component wall. Measured values determined for the temperature of the wall and the temperature of the working medium can be used to estimate temperature differences within the component wall and in particular to determine the assigned average integral wall temperature. Comparison of the average integral temperature with permissible limit values makes it possible to keep the thermal material stresses within permissible limits. However, this method is comparatively cost-intensive and error-prone.

Alternatively, the average integral wall temperature can also be calculated without the need for costly and error-prone measuring points incorporated in the wall or in the case of components which cannot be provided with a measuring point (for example a turbine shaft). One possible method is to calculate this temperature by means of a mathematical substitute model, in particular on the basis of the Bessel equation, for the heat conduction in a metal rod. However, systems previously realized on this basis in the instrumentation and control of industrial plants, such as for example tubes of steam power plants, have a tendency to undergo oscillations, dependent on the period of the temperature changes of the working medium, which limit reliable assessment of the temperature values obtained in such a way.

SUMMARY OF INVENTION

The invention is therefore based on the object of providing a method for determining the average integral wall temperature/axial temperature which produces a particularly accurate picture of the temperature profile, and at the same time is particularly robust and intrinsically stable, without the use of temperature measuring points in the wall concerned.

This object is achieved according to the invention by using a multilayer model based on the average temperature of each layer for determining the average integral wall temperature during heating-up or cooling-down processes.

When a multilayer model is used in such a way, the component wall is additionally divided up into a number of layers lying parallel to the surface, the number of layers depending on the wall thickness. The material data used for each layer (thermal capacity, thermal conductivity) are independent of the layer geometry. A transient balancing of the heat flows entering and leaving takes place in each layer. The transient heat balance obtained is used to determine the corresponding average layer temperatures.

The multilayer model advantageously uses as measured values only the process variables of the steam temperature $T_{AM}$ and steam mass flow $\dot{m}_{AM}$ as well as the initial temperature profile in the wall, which in the balanced initial state can be represented by an initial wall temperature $T_{Anf}$. If there is no steam mass flow measurement, the steam throughput is calculated by means of a substitute model based on the pressure $p_{AM}$ and the valve position $H_{AV}$ or the free flow cross section. These process variables can be easily acquired and are generally available in any case in the instrumentation and control of a technical plant. In particular, no additional measuring points that have to be integrated in the wall concerned are required.

The invention is based on the consideration that it is possible to calculate the temperature profile in the wall, and consequently the average integral wall temperature, during heating-up and cooling-down processes sufficiently accurately and stably by means of a multilayer model, thereby dispensing with cost-intensive and error-prone measuring points incorporated in the wall and also in cases where no direct temperature measurement is possible. For this purpose, determination of the momentary wall temperature profile as a function of the transient heat flow balance is envisaged. In principle, it is possible to work with the inner and outer wall surface temperatures of the thick-walled component or even with the temperature of the working medium and the ambient or insulating temperature or else just the surface temperature (for example in the case of a shaft).

However, it proves to be particularly favorable to divide the thick walls up into a number of layers. A resultant advantage is better determination of the wall temperature profile, and consequently better calculation of the average integral wall temperature, since the transient temperature profile within a thick wall has strong non-linearity. The reason for this is, in particular, that the thermal conductivity of the material and the specific thermal capacity of the material are themselves temperature-dependent. A further advantage of the use of a multilayer model is that, if the wall is divided up sufficiently finely into a number of layers, a forward-directed calculation structure can be used for calculating the temperature-dependent thermal conductivity and specific thermal capacity, i.e. the average temperature of the preceding layer instead of the current layer is used, thereby avoiding feedback, which may also have a positive sign, and the calculation circuit thereby having a much more robust behavior.

The calculation of the heat transfer coefficient α preferably takes place with allowance for the steam condensation, the wet steam and the superheated steam. For this, detection of the state of the working medium takes place in a module. Both possible condensation, with the corresponding steam element and water element, and the superheated steam state are detected. If superheated steam is exclusively provided as the working medium, the heat transfer coefficient $\alpha_{AM}$ for the transfer of the heat flow from the working medium into the first layer of wall is advantageously formed as a function of the steam throughput $\dot{m}_{AM}$.

If, on the other hand, steam condensation occurs, the transfer coefficient α is advantageously calculated by a constant heat transfer coefficient $\alpha_W$ being used for the condensed element of the working medium, the so-called condensation component. In order to determine this condensation component, the saturation temperature $T_S$ is used as a function of the pressure $p_{AM}$, the temperature $T_{AM}$ of the working medium and the temperature of the heated/cooled surface $T_1$ (the average temperature of the first layer).

The temperature of the first layer of the thick-walled component $T_1$ is subtracted from the greater of the two values and the result is compared with a constant K, which can be set. The greater of these two values forms the divisor of two quotients, which have in the dividend the difference between the temperature of the working medium and the saturation temperature $T_{AM}-T_S$ and the difference between the saturation temperature and the temperature of the first layer of the thick-walled component $T_S-T_1$. The first quotient, if it is positive, is multiplied by the heat transfer coefficient $\alpha_{AM}$ of the superheated steam, the second quotient, if it is positive, is multiplied by the heat transfer coefficient $\alpha_W$ for water, in order to allow for the condensation. The sum of the two products is compared with the heat transfer coefficient $\alpha_{AM}$ of the superheated steam. The greater of the two values is the resultant heat transfer coefficient α.

The calculation of the average integral wall temperature $T_{Int}$ is obtained in a particularly advantageous way from a transient balancing of the entering and leaving heat flows in n individual layers. This takes place in n so-called layer modules.

In the first layer module, the heat flow of the working medium into the first layer $\dot{q}_{AM-1}$ and the heat flow from the first layer into the second layer $\dot{q}_{1-2}$ are calculated with the aid of the heat transfer coefficient α; the temperature $T_{AM}$ of the working medium and the average temperature. With the initial temperature $T_{Anf}$ in the layer concerned, the average temperature $T_1$ of the first layer is obtained by integration over time from the transient difference between the heat flows of the working medium into the first layer and from the first layer into the second layer $\dot{q}_{AM-1}-\dot{q}_{1-2}$.

In a kth layer module, the average temperature of the kth layer $T_k$ is calculated with the aid of the transient heat flow balance of the (k−1)th layer $\dot{q}_{(k-1)-k}$ and from the kth layer into the (k+1)th layer q k-(k+1). With the initial temperature $T_{Anf\_k}$ of the kth layer, the average temperature $T_k$ of the kth layer is obtained by integration of the transient difference between the heat flows $\dot{q}_{(k-1)-k}-\dot{q}_{k-(k+1)}$ into and from the kth layer over time.

In the last layer module, finally, the average temperature $T_1$ of the last (nth) layer is calculated from the transient heat flow balance from the last-but-one (n−1)th layer into the last (nth) layer and from the last layer into the thermal insulation $\dot{q}_{(n-1)-n}-\dot{q}_{n-ISOL}$.

The temperature dependence of the thermal conductivity $\lambda_k$ and the specific thermal capacity $c_k$ of the kth layer is expediently approximated by polynomials, preferably of the second degree, or specified by corresponding functions.

Finally, the average integral wall temperature $T_{Int}$ is determined in a module in a particularly advantageous way by weighting of the average temperatures $T_k$ of the individual layers with allowance for the weight of the material of the layer and the weight of the material of the equivalent portion of the wall.

The entire method is preferably carried out in a specific enhanced data processing system, preferably in an instrumentation and control system of a steam power plant.

The advantages achieved with the invention are, in particular, that the wall temperature profiles and the average integral wall temperature of thick-walled components can be reliably and stably specified alone from the process parameters of the mass flow and temperature of the working medium as well as the initial temperature distribution in the wall and, if no direct measurement of the temperature throughput is available or possible, additionally with pressure and a valve position or a free flow cross section, thereby dispensing with measuring points incorporated in the component walls. The greater the number of layers that is chosen here, the more accurate the determination of the average integral wall temperature/axial temperature becomes.

BRIEF DESCRIPTION OF THE DRAWINGS

An exemplary embodiment of the invention with the use of a three-layer model and allowance for insulation (fourth layer) is explained in more detail on the basis of a drawing, in which.

The same parts are provided with the same designations in all the figures.

DETAILED DESCRIPTION OF INVENTION

Figure 1:
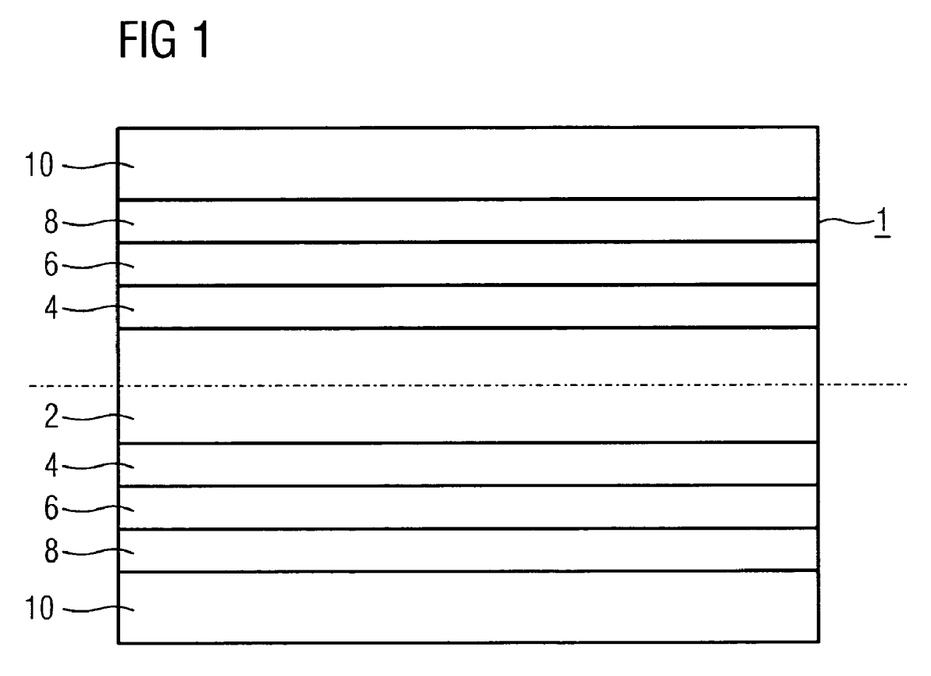
FIG. 1 shows a section through a steam tube as an example of a thick wall divided up into three layers.

FIG. 1 shows a tube portion 1 in section as an example of a thick wall. The interior space 2 of the steam tube is flowed through by the working medium (steam), and from here the heat flow is transferred into the first layer 4. This is followed by the second layer 6 and the third layer 8. The tube portion 1 is enclosed by the insulation 10.

Figure 2:
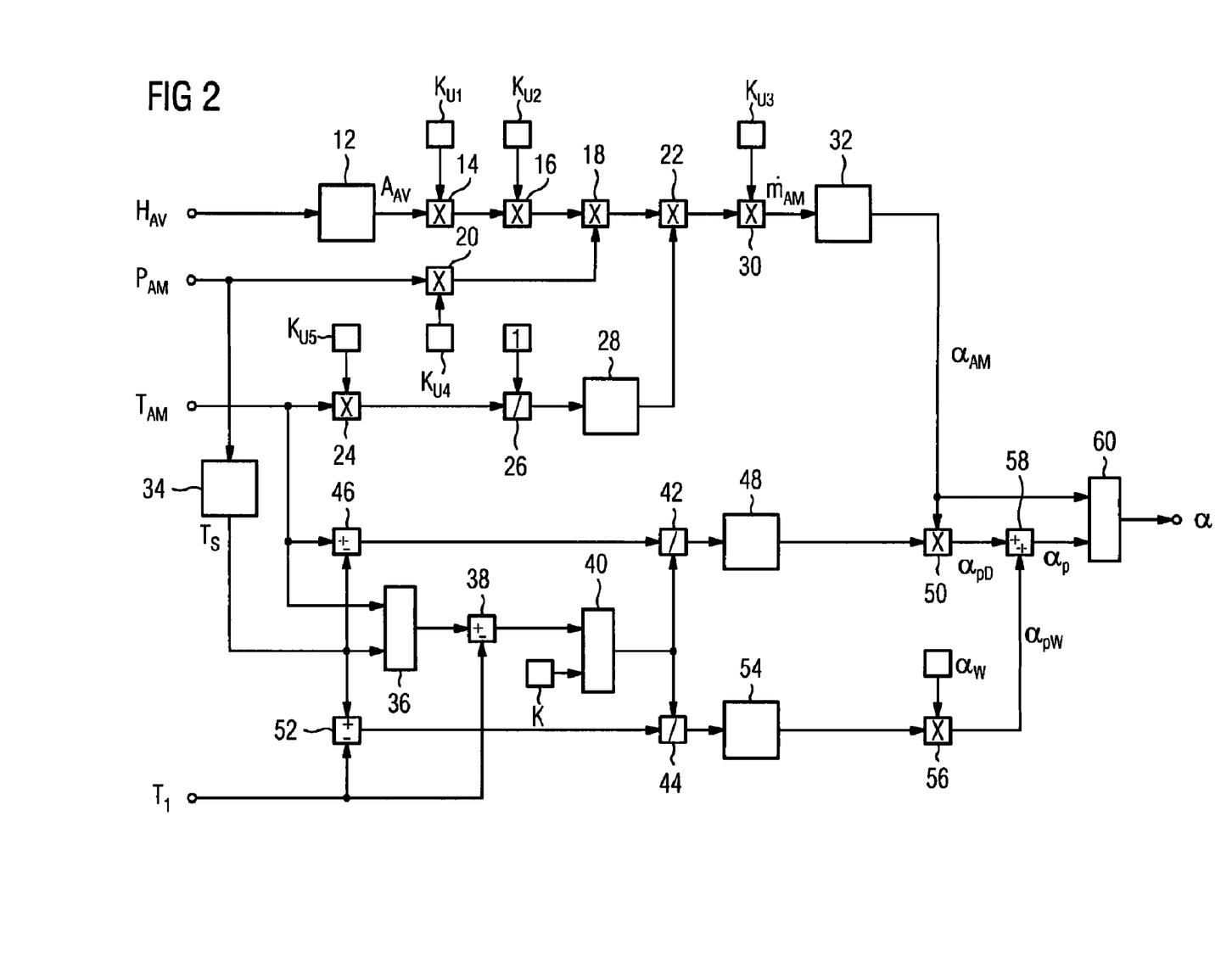
FIG. 2 shows a block diagram of the module for the calculation of the heat transfer coefficient.

According to FIG. 2, the measured value of the steam throughput $\dot{m}_{AM}$ is fed as the input signal to the function generator 32, which calculates from this the heat transfer coefficient $\alpha_{AM}$ as a function of the working medium $\dot{m}_{AM}$ for the case of steam, $\alpha_{AM}=f(\dot{m}_{AM})$. This function is given by a number of interpolation points, intermediate values being formed by suitable interpolation methods.

In order also to allow for the case of partial condensation, the pressure of the working medium $p_{AM}$ is also passed to the input of a function generator 34, which replicates the saturation function $T_s=f(p_{AM})$, and consequently supplies at its output the saturation temperature $T_S$ for the respective pressure. This function is given by interpolation points (pressures and temperatures from steam tables), intermediate values being determined by means of suitable interpolation methods.

The temperature of the working medium $T_{AM}$ is compared with the saturation temperature $T_S$ by the maximum generator 36. The average temperature of the first layer $T_1$ is subtracted from the greater value by a subtractor 38. The difference is compared by means of a maximum generator 40 with a constant K, which can be set. Consequently, the signal $$N=\max(\max(T_{AM};T_S)-T_1;K)$$

is present at the output of the maximum generator 40. It is passed to the divisor inputs of two dividers 42 and 44.

The divider 42 receives at its dividend input the difference $T_{AM}-T_S$ formed by means of the subtractor 46. The function generator 48 only passes on the signal $$\frac{T_{AM} - T_{XS}}{N}$$

to the one input of the multiplier 50 if it is positive. The signal indicates the percentage of the working medium that is evaporated, the so-called steam component. If the difference $T_{AM}-T_S$ is negative, that is to say the temperature of the working medium is lower than the saturation temperature, the signal "zero" is present at the corresponding input of the multiplier 50.

At the other input of the multiplier 50, the heat transfer coefficient $\alpha_{AM}$ for steam is present. Therefore, the heat transfer coefficient $\alpha_{pD}$ weighted with the steam component is passed to the one input of the adder 58.

The divider 44 receives at its dividend input the difference $T_S-T_1$ formed by the subtractor 52. The function generator 54 only passes the signal $$\frac{T_S - T_1}{N}$$

on to the one input of the multiplier 56 if it is positive. The signal specifies the percentage made up by the condensation component. If the difference $T_S-T_1$ is negative, that is to say the average temperature of the first layer is higher than the saturation temperature, the signal "zero" is present at the corresponding input of the multiplier 56.

The heat transfer coefficient $\alpha_W$ for water is present at the other input of the multiplier 56. Therefore, the heat transfer coefficient $\alpha_{pW}$ weighted with the condensation component is passed to the second input of the adder 59.

At the maximum generator 60, the heat transfer coefficient $\alpha_{AM}$ for the case of steam is present at one input. The heat transfer coefficient $$\alpha_p = \alpha_{pW} + \alpha_{pD}$$

for the case of partial condensation, formed by the adder 58, is present at the second input. The greater of the two values is the current heat transfer coefficient $\alpha$.

If there is no steam mass flow measurement, the steam mass flow is calculated, for example with the aid of the following calculation circuit. In a function generator 12, the actual value of a valve position $H_{AV}$ is converted into a free flow area $A_{AV}$. The free flow area is provided with suitable conversion factors $K_{U1}$ and $K_{U2}$ by means of multipliers 14 and 16 and passed to a further multiplier 18. The pressure of the working medium $p_{AM}$ is passed—likewise by means of a multiplier 20 with a suitable conversion constant $K_{U4}$—to the second input of the multiplier 18, the result of which is passed to the input of a multiplier 22. The temperature $T_{AM}$ of the working medium provided with a suitable conversion factor $K_{U5}$ by means of a multiplier 24 is passed to the denominator input of a divider 26, the numerator input of which receives a one. The reciprocal value is present at the output. The root of the reciprocal value is passed to the second input of the multiplier 22 by means of a root extractor 28. The signal at the output of the multiplier 22, provided with a suitable conversion factor $K_{U3}$ by means of a multiplier 30, represents the steam throughput $\dot{m}_{AM}$. Altogether, the following is consequently obtained for the calculation of the steam throughput:

$$A_{AV} = f(H_{AV})$$

$$\dot{m}_{AM} = K_{U3} * \sqrt{\frac{1}{K_{U5}T_{AM}}} K_{U4}T_{AM}K_{U1}K_{U2}A_{AV}.$$

Figure 3:
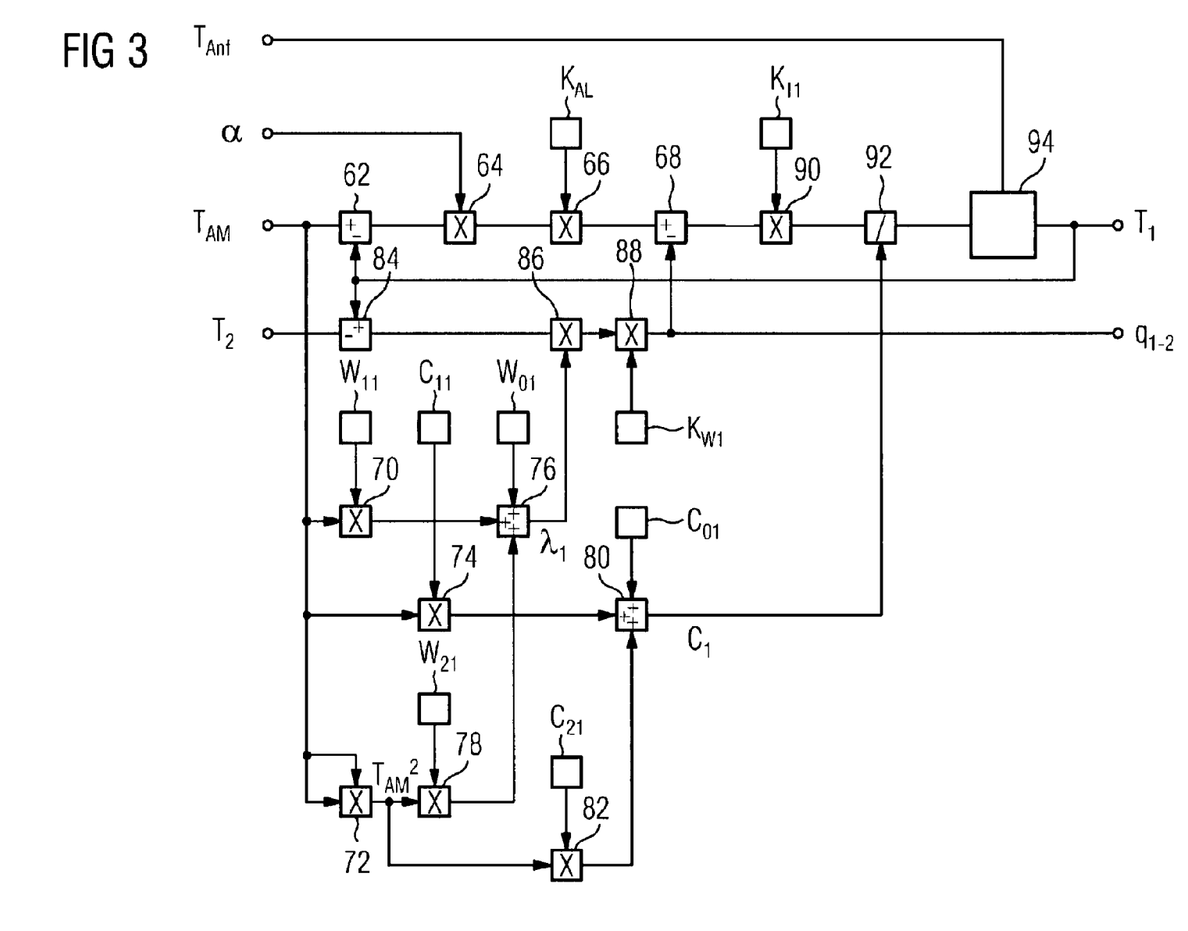
FIG. 3 shows a block diagram of the module for the calculation of the average temperature of the first layer.

The module for the first layer according to FIG. 3 determines the average temperature of the first layer $T_1$ from the transient heat flow balance. For this purpose, the temperature difference $T_{AM}-T_1$ is first formed by means of a subtractor 62 from the temperature of the working medium $T_{AM}$ and the average temperature of the first layer $T_1$ and is multiplied by the heat transfer coefficient $\alpha$ by means of a multiplier 64. A multiplier 66 provides the signal with a suitable coefficient $K_{AL}$, which can be set and represents an equivalent first surface—for the heat transfer from the working medium into the component wall. Present at the output of the multiplier 66 is the signal for the heat flow from the working medium into the first layer $$\dot{q}_{AM-1} = \alpha K_{AL}(T_{AM}-T_1)$$

which is passed to the minuend input of a subtractor 68.

In the exemplary embodiment, the temperature dependence of the thermal conductivity $\lambda_1$ and the specific thermal capacity $c_1$ of the first layer is approximated by polynomials of the second degree, which are represented by coefficients $W_{01}$, $W_{11}$ and $W_{21}$ as well as $C_{01}$, $C_{11}$ and $C_{21}$. The polynomials used in the example have the following form:

$$\lambda_1 = W_{01} + W_{11}T_{AM} + W_{21}T_{AM}^2$$

$$c_1 = C_{01} + C_{11}T_{AM} + C_{21}T_{AM}^2$$

This is replicated in terms of circuitry by the temperature of the working medium $T_{AM}$ being passed to the inputs of three multipliers 70, 72 and 74. For the purpose of avoiding possible positive feedback (depending on the properties of the material) and consequently an increase in the stability of the system, the forward-directed structure is used, i.e. the temperature of the working medium $T_{AM}$ is used instead of the average temperature of the first layer $T_1$.

To calculate the thermal conductivity, the polynomial constant $W_{11}$ is present at the second input of the multiplier 70. The output is connected to an input of an adder 76.

Present at the output of the multiplier 72 that is connected as a squarer is the signal for the square of the temperature of the working medium $T^2_{AM}$. It is multiplied by the polynomial constant $W_{21}$ by means of the multiplier 78 and subsequently passed to a second input of the adder 76.

The polynomial constant $W_{01}$ is switched to a third input of the adder 76. Present at its output is the temperature-dependent thermal conductivity $\lambda_1$, given by the above expression.

To calculate the specific thermal capacity, the polynomial constant $C_{11}$ is applied to the second input of the multiplier 74. The output of the multiplier 74 lies at an input of an adder 80. Present at a second input of the adder 80 is the polynomial constant $C_{01}$. The square of the temperature of the working medium $T^2_{AM}$ that is present at the output of the multiplier 72 is provided with the polynomial coefficient $C_{21}$ by means of the multiplier 82 and is subsequently passed to a third input of the adder 80. Present at its output is the temperature-dependent specific thermal capacity $c_1$, given by the above expression.

The subtractor 84 forms the temperature difference from the average temperatures of the first layer and the following layer $T_1$-$T_2$. It is multiplied by the temperature-dependent thermal conductivity $\lambda_1$, from the output of the adder 76, by means of the multiplier 86 and multiplied by the constant $K_{W1}$, which includes the dependence on the layer thickness and the equivalent surface, by means of the multiplier 88. Present at the output of the multiplier 88 is the signal for the heat flow from the first layer into the second layer $$\dot{q}_{1-2}=\lambda_1 K_{W1}(T_1-T_2).$$

This signal is passed to the subtrahend input of the subtractor 68. Present at its output is the signal for the heat flow difference $\dot{q}_{AM-1}-\dot{q}_{1-2}$, which is provided by means of the multiplier 90 with a coefficient $K_{T1}$, which allows for the rate of change of the temperature in the first layer in dependence on the weight of the material of the layer.

The resultant signal is divided by the signal that is present at the output of the adder 80 for the temperature-dependent specific thermal capacity $c_1$ by means of a divider 92.

The average temperature of the inner layer is obtained by integration of the heat flow difference over time t $$T_1 = \frac{K_{T1}}{c_1} \int_0^t (\dot{q}_{AM-1} - \dot{q}_{1-2})dt + T_{Anf1}.$$

The signal present at the output of the divider 92 is fed to an integrator 94, which uses the initial temperature of the first layer $T_{Anf1}$ as the initial condition.

Figure 4:
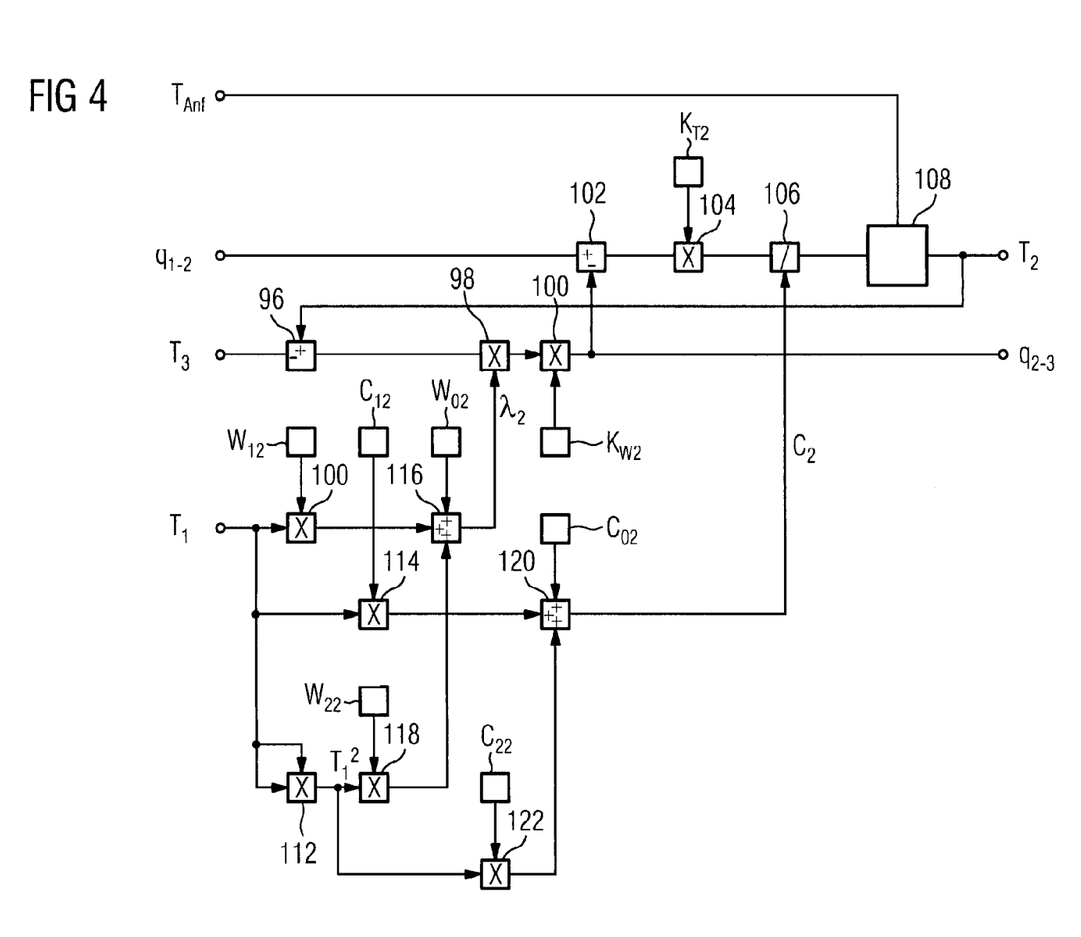
FIG. 4 shows a block diagram of the module for the calculation of the average temperature, of the second layer.

The module for the second layer according to FIG. 4 determines the average temperature of the second layer $T_2$ from the transient heat flow balance. For this purpose, the difference $T_2$-$T_3$ is initially formed by means of a subtractor 96 from the temperature of the third layer $T_3$ and the average temperature of the second layer $T_2$ and multiplied by the temperature-dependent thermal conductivity $\lambda_2$ of the second layer by means of a multiplier 98. A multiplier 100 provides the signal with a suitable coefficient $K_{W2}$, which can be set and includes the dependence of the thermal conductivity on the layer thickness and surface. Present at the output of the multiplier 100 is the signal for the heat flow from the second layer into the third layer $$\dot{q}_{2-3}=\lambda_2 W_{W2}(T_2-T_3),$$

which is passed to the subtrahend input of a subtractor 102.

Present at the minuend input of the subtractor 102 is the signal for the heat flow $\dot{q}_{1-2}$ from the first layer into the second layer. Its input supplies the heat flow difference $\dot{q}_{1-2}-\dot{q}_{2-3}$. A multiplier 104 provides this signal with a coefficient $K_{T2}$, which can be set and allows for the rate of change of the temperature in the second layer in dependence on the weight of the material of the layer. Subsequently, the signal is divided by the temperature-dependent specific thermal capacity $c_2$ of the second layer by means of a divider 106 and is then passed to the input of an integrator 108. The integrator 108 uses the initial temperature $T_{Anf2}$ of the second layer as the initial condition. Present at its output is the average temperature of the second layer $$T_2 = \frac{K_{W2}}{c_2} \int_0^t (\dot{q}_{1-2} - \dot{q}_{2-3})dt + T_{Anf2}.$$

The temperature dependence of the thermal conductivity $\lambda_2$ and the specific thermal capacity $c_2$ of the second layer is again approximated by polynomials with coefficients $W_{02}$, $W_{12}$ and $W_{22}$ as well as $c_{02}$, $c_{12}$ and $c_{22}$. The polynomials are:

$$\lambda_2=W_{02}+W_{12}T_1+W_{22}T_1^2$$

$$c_2=C_{02}+C_{12}T_1+C_{22}T_1^2$$

This is replicated in terms of circuitry by the average temperature of the first layer $T_1$ being passed to the inputs of three multipliers 110, 112 and 114. For the purpose of avoiding possible positive feedback (depending on the properties of the material) and consequently an increase in the stability of the system, a forward-directed structure is used, i.e. the average temperature of the first layer $T_1$ is, used instead of the average temperature of the second layer $T_2$.

To calculate the thermal conductivity, the polynomial constant $W_{12}$ is present at the second input of the multiplier 110. The output is connected to an input of an adder 116.

Present at the output of the multiplier 112 that is connected as a squarer is the signal for the square of the average temperature of the first layer $T_1^2$. It is multiplied by the polynomial constant $W_{22}$ by means of the multiplier 118 and subsequently passed to a second input of the adder 116. The polynomial constant $W_{02}$ is switched to a third input of the adder 116. Present at its output is the temperature-dependent thermal conductivity $\lambda_2$, given by the above expression.

To calculate the temperature-dependent specific thermal capacity, the polynomial constant $C_{12}$ is applied to the second input of the multiplier 114. The output of the multiplier 114 lies at an input of an adder 120. Present at a second input of the adder 120 is the polynomial constant $C_{02}$. The square of the average temperature of the first layer $T_1^2$ that is present at the output of the multiplier 112 is provided with the polynomial coefficient $C_{22}$ by means of the multiplier 122 and is subsequently passed to a third input of the adder 120. Present at its output is the temperature-dependent specific thermal capacity $c_2$, given by the above expression.

Figure 5:
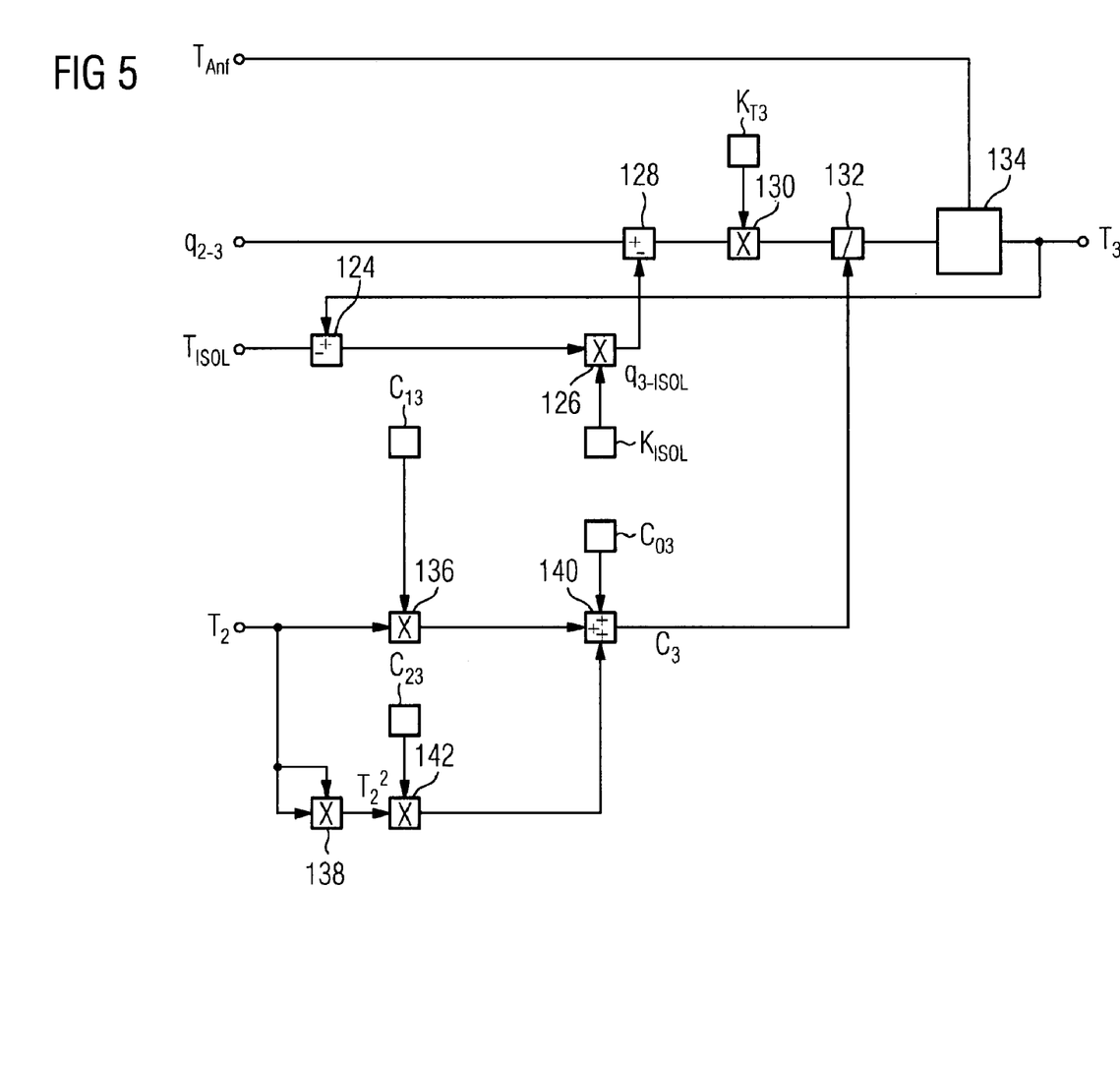
FIG. 5 shows a block diagram of the module for the calculation of the average temperature of the third layer.

The module for the third layer according to FIG. 5 determines the average temperature of the third layer $T_3$ from the heat flow balance. For this purpose, the temperature difference $(T_3-T_{ISOL})$ is first formed by means of a subtractor 124 from the temperature of the insulation $T_{ISOL}$ and the average temperature of the third layer $T_3$ and is multiplied by a suitable constant $K_{ISOL}$, which can be set and represents the magnitude of the heat losses of the insulation, by means of a multiplier 126. Present at the output of the multiplier 126 is the signal for the heat flow from the third layer into the insulation (here there is also the possibility of the heat losses of the insulation being directly specified)

$$\dot{q}_{3\_ISOL}=K_{ISOL}(T_3-T_{ISOL})$$

which is passed to the subtrahend input of a subtractor 128.

Present at the minuend input of the subtractor 128 is the signal for the heat flow $\dot{q}_{2-3}$ from the second layer into the third layer. Its input supplies the heat flow difference $\dot{q}_{2-3}-\dot{q}_{3\_ISOL}$. A multiplier 130 provides this signal with a coefficient $K_{T3}$, which can be set and allows for the rate of change of the temperature in the third layer in dependence on the weight of the material of the layer. Subsequently, the signal is divided by the temperature-dependent specific thermal capacity $c_3$ of the third layer by means of a divider 132 and is then passed to the input of an integrator 134. The integrator 134 uses the initial temperature of the third layer $T_{Anf3}$ as the initial condition. Present at its output is the average integral temperature of the third layer $$T_3 = \frac{K_{W3}}{c_3} \int_0^t (\dot{q}_{2-3} - \dot{q}_{3-ISOL}) dt + T_{Anf3}.$$

The temperature dependence of the specific thermal capacity $c_3$ of the third layer is approximated by a polynomial with coefficients $C_{03}$, $C_{13}$ and $C_{23}$.

The polynomial is:

$$c_3 = C_{03} + C_{13} T_2 + C_{23} T_2^2.$$

For the purpose of avoiding possible positive feedback (depending on the properties of the material) and consequently an increase in the stability of the system, a forward-directed structure is used here, i.e. the average temperature of the second layer $T_2$ is used here instead of the average temperature of the third layer $T_3$.

This is replicated in terms of circuitry by the average temperature of the second layer $T_2$ being passed to the inputs of two multipliers 136 and 138. The coefficient $C_{13}$ is applied to the second input of the multiplier 136. The output of the multiplier 136 lies at an input of an adder 140. Present at a second input of the adder 140 is the polynomial constant $C_{03}$. The square of the average temperature of the second layer $T_2^2$ that is present at the output of the multiplier 138 is provided with the polynomial coefficient $C_{23}$ by means of a multiplier 142 and is subsequently passed to a third input of the adder 140. Present at its output is the temperature-dependent specific thermal capacity $C_3$, given by the above expression.

Figure 6:
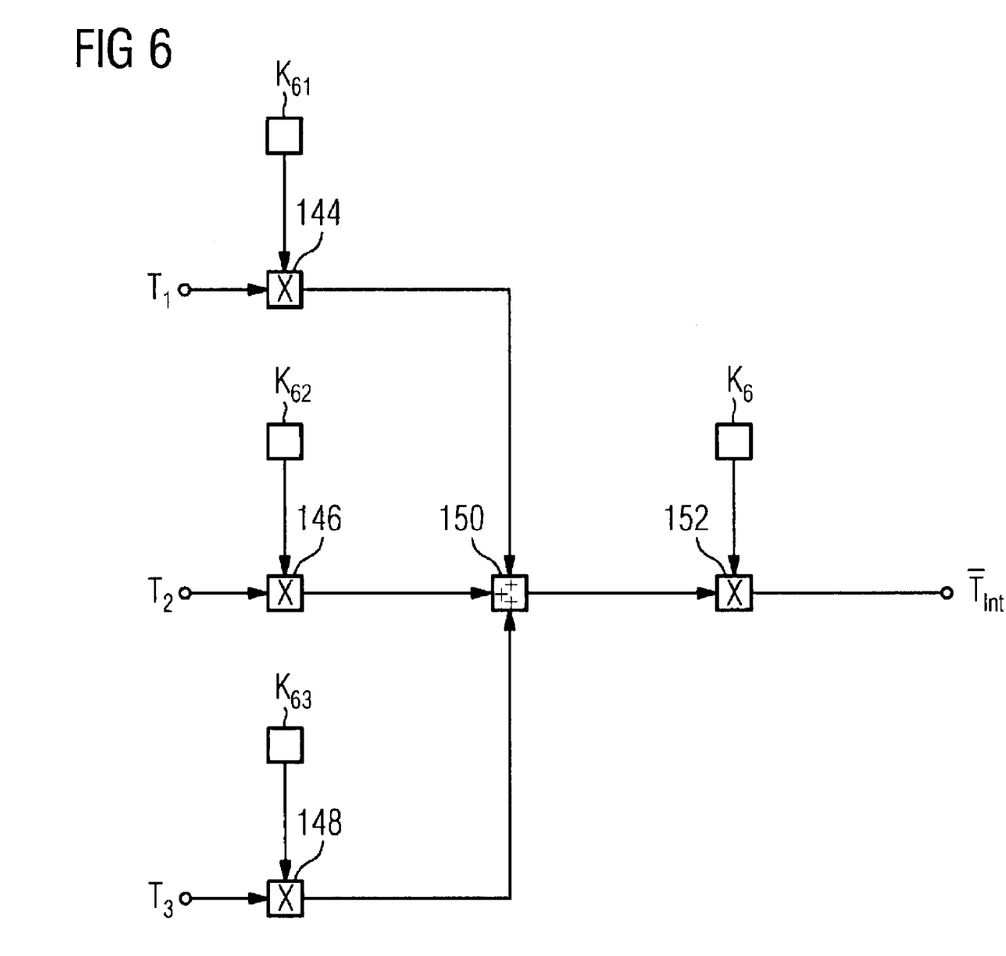
FIG. 6 shows a block diagram of the module for the calculation of the average integral wall temperature.

According to FIG. 6, the average integral wall temperature $T_{Int}$ is determined from the average temperatures of the individual layers $T_1$, $T_2$ and $T_3$. Three multipliers 144, 146 and 148 provide the temperature signals with suitable weighting factors $K_{G1}$, $K_{G2}$ and $K_{G3}$, which weight the average temperatures of the individual layers in a way corresponding to the weight of the material of the layer. The weighted temperature signals pass to inputs of an adder 150. Its output signal is provided with a coefficient $K_G$, which allows for the influence of the overall weight of the material of the equivalent portion of the wall, by means of a multiplier 152. Present at the output of the multiplier 152 is the signal for the average integral wall temperature $T_{Int}$.

The invention claimed is:

1. A method for determining an integral average temperature in a wall of a component, comprising:
   dividing the wall of the component into a plurality of layers;
   calculating an average temperature for each layer of the plurality of layers with allowance for the heat flow into neighboring layers; and
   determining the average integral temperature in the wall of the component using the average temperature for each of the plurality of layers in addition to using a plurality of measured variables,
   wherein the integral average temperature in the wall of the component is determined without using temperature measuring points in the wall.

2. The method as claimed in claim 1, wherein the plurality of measured variables includes a plurality of variables of a temperature and a mass flow of a working medium flowing along the wall.

3. The method as claimed in claim 2, wherein a steam throughput is determined from a pressure and temperature of the working medium as well as a free valve cross section.

4. The method as claimed in claim 3, wherein a heat transfer coefficient for the heat transfer of the working medium into the wall of the component in the case of exclusively superheated steam is determined as a function of the steam throughput.

5. The method as claimed in claim 3, wherein a heat transfer coefficient for the heat transfer of the working medium into the wall of the component in the presence of condensation is determined in dependence on a condensation component.

6. The method as claimed in claim 5, wherein the average temperature of each layer is calculated from a transient heat flow balance for the layer in question.

7. The method as claimed in claim 6, wherein the temperature dependence of a thermal conductivity of each layer is approximated by a second degree polynomial.

* * * * *